(12) United States Patent
Prakash

(10) Patent No.: US 6,718,460 B1
(45) Date of Patent: Apr. 6, 2004

(54) MECHANISM FOR ERROR HANDLING IN A COMPUTER SYSTEM

(75) Inventor: Raj Prakash, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 591 days.

(21) Appl. No.: 09/655,258

(22) Filed: Sep. 5, 2000

(51) Int. Cl.[7] .............................. G06F 9/44; G06F 9/38; G06F 9/40
(52) U.S. Cl. ................ 712/239; 712/207; 712/240; 712/244; 712/245; 712/219; 712/227
(58) Field of Search ................ 712/207, 235, 712/237, 240, 244, 245, 219, 239, 234, 227

(56) References Cited

U.S. PATENT DOCUMENTS 5,287,467 A * 2/1994 Blaner et al. ............... 712/235
5,887,161 A * 3/1999 Cheong et al. ............. 712/244
6,032,244 A * 2/2000 Moudgill .................... 712/23

* cited by examiner

Primary Examiner—Daniel H. Pan
(74) Attorney, Agent, or Firm—Thelen Reid & Priest LLP

(57) ABSTRACT

In one aspect, a method for managing program flow in a computer system having a processor having a prefetch mechanism and an instruction pipeline includes providing a set of program instructions having a conditional branch instruction and an system fault-causing instruction, prefetching at least one instruction into the instruction pipeline, the instruction including at least a conditional branch instruction, predicting the outcome of the conditional branch instruction; and prefetching instructions into the instruction queue based upon the result of the predicting step. The branch instruction is configured to direct program flow into or beyond the system fault instruction depending on the result of a predetermined condition.

14 Claims, 4 Drawing Sheets

⋮

34 Program instruction
36 Program instruction
38 (Perform test to set CC to a "1" or a "0")
40 BR CC, (Address of line 44 instruction)
42 Ld 0
44 continue with normal program flow

FIG. 3

54 Program instruction
56 Program instruction
58 (Perform test to set CC to a "1" or a "0")
60 BR CC, (Address of line 96 instruction)
62 ...
64 ...
⋮

<other program steps>
⋮

74 Program instruction
76 Program instruction
78 (Perform test to set CC to a "1" or a "0" depending on predetermined condition)
80 BR CC, "1", (Address of line 84 instruction)
82 Ld 0
84 <continue with normal program flow>

FIG. 5

MECHANISM FOR ERROR HANDLING IN A COMPUTER SYSTEM

BACKGROUND OF THE INVENTION

Computer processors contain arithmetic, logic, and control circuitry that interpret and execute instructions from a computer program. In the pursuit of improving processor performance, designers have sought two main goals: making operations faster and executing more operations in parallel. Making operations faster can be approached in several ways. For example, transistors can be made to switch faster and thus propagate signals faster by improving semiconductor processes; execution-unit latency can be reduced by increasing the number of transistors in the design; and the levels of logic required by the design to implement a given function can be minimized to increase speed. To execute more operations in parallel, designers mainly rely on one, or a combination of pipelining and superscalar techniques. Pipelined processors overlap instructions in time on common execution resources. Superscalar processors overlap instructions in space on separate resources.

Pipeline stalls are a main performance inhibitor with regard to parallel processing. Stalls arise from data dependencies, changes in program flow, and hardware resource conflicts. At times, pipeline stalls can be avoided by rearranging the order of execution for a set of instructions. Compilers can be used to statically reschedule instructions, however, incomplete knowledge of run-time information reduces the effectiveness of static rescheduling. In-order processors, i.e., processors that issue, execute, complete, and retire instructions in strict program order, have to rely entirely on static rescheduling and thus are prone to pipeline stalls.

As a result, designers use out-of-order processors and seek to implement dynamic instruction rescheduling. The simplest out-of-order processors issue instructions in order but allow them to execute and complete out of order. Even these simple out-of-order processors require complex hardware to reorder results before the corresponding instructions are retired. A strict result order is not required from a data-flow perspective, however, such ordering is necessary to maintain precise exceptions and to recover from mispredicted speculative execution.

A well-known method of reordering is through the use of a reorder buffer, i.e., a buffer that maintains results until written to the register file in program order. Designers also use other types of reordering hardware, such as history buffers and future files. History buffers record source-operand history so the processor can backtrack to a precise architectural state and future files store the current state and the architectural state in separate register files allowing the processor to be restored to a precise check-point state.

Branch prediction and speculative execution are additional techniques used to reduce pipeline stalls. In a pipelined processor, the outcomes of conditional branches are often determined after fetching subsequent instructions. Thus, if the correct direction of the unresolved branch can be predicted, the instruction queue can be kept full of instructions that have a high probability of being used. In some processors, instructions are actually executed speculatively beyond unresolved conditional branches. This technique completely avoids pipeline stalls when the branch proceeds in the predicted direction. On the other hand, if the branch direction is mispredicted, the pipeline must be flushed, instruction fetch redirected, and the pipeline refilled.

Referring to FIG. 1, a typical computer system 10 includes a Prefetch, branch prediction, and dispatch unit (PDU) 12, Integer execution unit (IEU) 14, Floating-point unit (FPU) 16, Memory interface unit (MIU) 18, External cache (E-Cache) unit (ECU) 20, load store unit (LSU) 22, and Memory management unit (MMU) 24.

PDU 12 fetches instructions before they are actually needed in the pipeline, so the execution units constantly have instructions to execute. Instructions can be prefetched from all levels of the memory hierarchy, including the instruction cache, the external cache and the main memory. In order to prefetch across conditional branches, a dynamic branch prediction scheme is implemented in hardware. The outcome of a branch is based on a two-bit history of the branch. A "next field" associated with every four instructions in the instruction cache (I-Cache) points to the next I-Cache line to be fetched. The use of the "next field" makes it possible to follow taken branches and basically provides the same instruction bandwidth achieved while running sequential code. Prefetched instructions are stored in the instruction buffer until they are sent to the rest of the pipeline.

When prefetching instructions, the results of conditional trap instructions are difficult to predict. Therefore, in prior art systems, PDU 12 stops prefetching instructions until the trap instruction is actually executed. When a trap instruction is encountered by PDU 12, prefetching is halted, since it is very difficult to predict whether a trap instruction will result in a transition into program code containing trap handling instructions, or will instead proceed with normal program flow. As a result, the instruction pipelines will eventually deplete, and no instructions will be executed, until the trap instruction is resolved. Thus, overall instruction execution efficiency is lower than otherwise would be obtained if an error mechanism were able to be predicted. It would therefore be beneficial to provide a method for executing an error handling mechanism in such a way as to enable branch prediction and therefore increase instruction execution efficiency.

SUMMARY OF THE INVENTION

In one aspect, a method for managing program flow in a computer system having a processor having a prefetch mechanism and an instruction pipeline includes providing a set of program instructions having a conditional branch instruction and an system fault-causing instruction, prefetching at least one instruction into the instruction pipeline, the instruction including at least a conditional branch instruction, predicting the outcome of the conditional branch instruction; and prefetching instructions into the instruction queue based upon the result of the predicting step. The branch instruction is configured to direct program flow into or beyond the system fault instruction depending on the result of a predetermined condition.

Other aspects and advantages of the invention will be apparent from the following description and the appended claims.

BRIEF DESCRIPTION OF THE DRAWINGS

FIG. 3 is an example code segment including an embodiment of the present invention.

FIG. 4 is an example code segment including an embodiment of the present invention.

FIG. 5 is an example code segment including an embodiment of the present invention.

DETAILED DESCRIPTION OF THE INVENTION

Various embodiments of the invention will now be described with reference to the accompanying figures.

Figure 2:
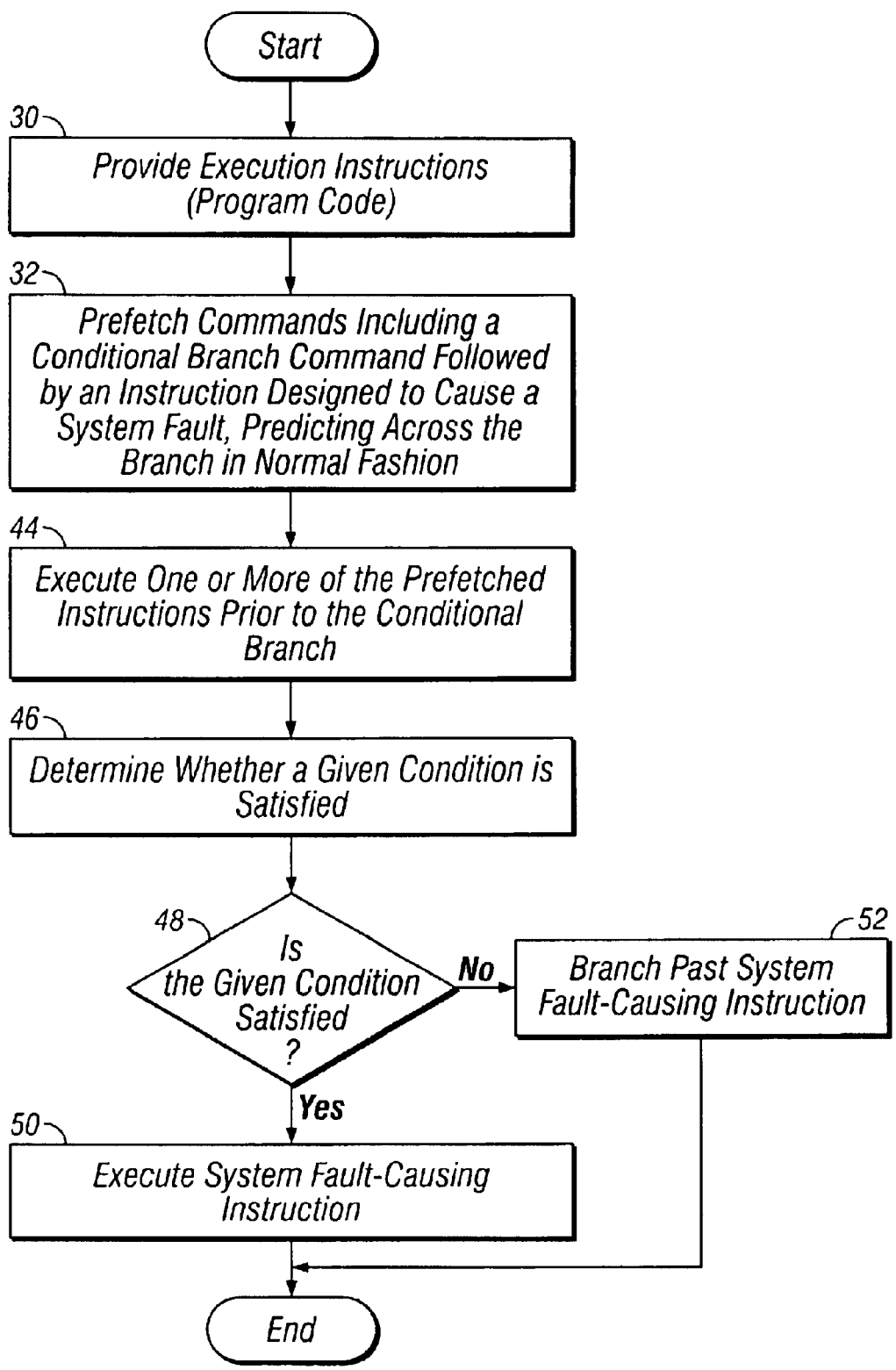
FIG. 2 is a flow chart showing a process in accordance with an embodiment of the present invention.

Referring to FIG. 2, a method of the present invention begins at block 30 when an execution instruction set is provided, the execution instruction set including an error managing instruction set followed by at least one normal program flow instruction. The error managing instruction set includes at least one instruction which determines the desirability of initiating an error flag, a branch instruction and a system fault-causing instruction.

By way of example, one such instruction set is shown in FIG. 3. Line numbers are provided for reference only. At lines 34 and 36, normal program instructions are provided.

At line 38 an instruction to test for a predetermined condition is provided, wherein the existence of that condition sets a variable to a predetermined state. For example, such an instruction may determine whether a register is zero or nonzero. If the register is zero, the variable CC may be set to "1".

At line 40, a conditional branch instruction is provided which branches to a given address if the condition code CC is satisfied.

At line 42, a system fault-causing instruction is provided. The example provided herein of a system fault-causing instruction is a LOAD from memory location "0", a nonexistent address. When this instruction is executed, a system fault is initiated, and a system trap is forced. Those of ordinary skill in the art having the benefit of this disclosure would readily realize that there are many ways to cause a system fault. It is contemplated that any system fault-causing instruction may be used in connection with the present invention.

Figure 1:
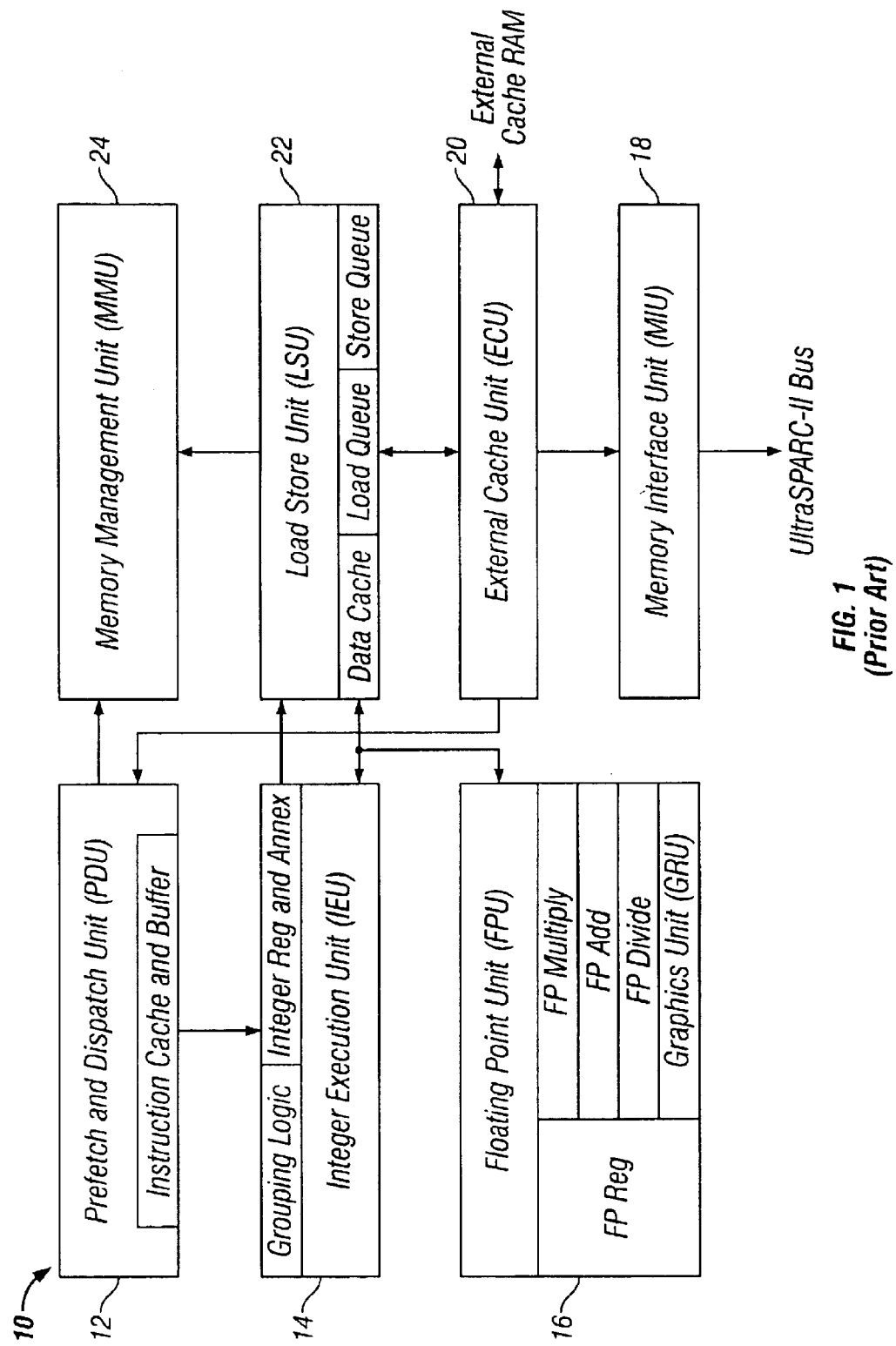
FIG. 1 shows a typical computer system.

Referring back to FIG. 2, the method continues at block 44 where instructions are prefetched into the pipeline from the normal program flow. In this block, for example, instructions such as those provided in the FIG. 3 example at lines 34, 36, and 38 are prefetched into the pipeline. Following the prefetching of the instruction at line 38, the branch instruction is encountered by the PDU 12 (FIG. 1). In order to prefetch across the branch, the previous information relating to prior branch executions is reviewed, in order to make an educated guess about whether this particular branch will likely be taken. Once that educated guess is made, further instructions are prefetched into the pipeline, based on whether the branch is more or less likely to be taken.

It is critical to recognize the importance of being able to predict instruction execution beyond a branch, a prediction which is not possible when a trap instruction is encountered. Trap instructions are conceptually necessary in order to periodically test for possible error conditions which have arisen during program execution. However, because trap instructions are not predictable in their execution flow, a very beneficial increase in instruction execution efficiency will result from the incorporation of the present invention to replace trap instructions. This increase in efficiency results directly from the ability of branch instructions to be predictable in their instruction flow, thus enabling PDU to keep the pipeline full, thus enabling the integer and floating point execution units to remain continuously active.

In the example of FIG. 3, if the branch is more likely to NOT be taken, instructions at lines 42 and 44 will be prefetched, possible with instructions subsequent to line 44. Note that this scenario includes the system fault-causing instruction, and that instruction will be prefetched and likely executed, if the prediction relating to the branch is correct.

If, in the FIG. 3 example, the branch is predicted to likely be taken, the instruction at line 42 is not prefetched. Rather, the instruction at line 44 is prefetched after the branch is predicted.

Referring again to FIG. 2, the method proceeds at block 46 when it is determined whether the predetermined condition is satisfied. This block will be satisfied in the example of FIG. 3 when the instruction at line 38 is executed.

At block 48, the equivalent of line 40 in the example of FIG. 3, a decision is made to route the program flow normally if the condition is satisfied, or to instead route program flow around the system fault-causing instruction.

If, at block 46, the predetermined condition was satisfied, program flow will proceed, at block 48, to block 50. At block 50, the system fault-causing instruction is executed, causing a system-level trap management program to be executed.

If, at block 46, the predetermined condition was not satisfied, program flow will proceed, at block 48, to block 52. At block 52, the next normal program instruction is executed.

In another embodiment of the present invention such as seen in FIG. 4, the system fault-causing instruction is not contiguous with the branch instruction. It is contemplated that many instructions may be present between lines 64 and 96. In this embodiment, the predetermined condition shows there is an error, and the conditional branch directs program flow to the system fault-causing instruction at line 96.

Some processors, such as the ULTRASparc II (available from Sun Microsystems, Inc. Palo Alto, Calif.) have a special type of conditional branch instruction which attempts to keep the pipeline full when a branch operation is in the program flow. This special conditional branch instruction, when the branch is determined to be taken, always executes the instruction which follows. This following instruction is called a delay-slot instruction, and is represented as instruction 82 in FIG. 5. When the branch is not taken, the delay slot instruction is either executed or bypassed, depending on the second operand of the branch instruction itself, represented by the "1" in instruction 80. In this construction, and according to the embodiment of FIG. 5, the delay slot instruction is not executed if a branch is not taken.

In the FIG. 5 embodiment, if the branch is not taken, instruction 84 and succeeding instructions will be loaded into the execution pipeline. If the branch is taken, instruction 82 and succeeding instructions will be loaded into the execution pipeline. Either case is extremely fast, and results in no delays as would normally be associated with a prior art trap instruction.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A method of handling program execution errors in a computer system, the computer system having a prefetch mechanism, an instruction pipeline, and a branch prediction mechanism, the method comprising:

providing a set of program instructions comprising an error managing instruction set and a set of post branch instructions, wherein said error managing instruction set includes a conditional branch instruction and a system fault-causing instruction, said system fault-causing instruction is executed when the branch is taken, and said set of post branch instructions are listed for execution whether or not the branch is taken; and prefetching into the instruction pipeline at least said conditional branch instruction and said set of post branch instructions, wherein said set of post branch instructions are prefetched whether the branch prediction mechanism predicts that the branch will be taken or not and potential consequences of a wrong branch prediction are thereby at least reduced.

2. The method of claim 1, wherein said system fault-causing instruction immediately follows said conditional branch instruction.

3. The method of claim 1, wherein said system fault-causing instruction is not contiguous in instruction memory with said conditional branch instruction.

4. The method of claim 1, wherein said system fault-causing instruction immediately follows said conditional branch instruction and said conditional branch instruction is configured to cause program flow to bypass said system fault-causing instruction when the branch is not taken.

5. The method of claim 1, further comprising:

executing said conditional branch instruction.

6. The method of claim 5, further comprising:

executing said system fault-causing instruction.

7. The method of claim 6, further comprising:

executing a system-level trap management program upon execution of said system fault-causing instruction.

8. A machine readable media having stored thereon instructions to perform a method of handling program execution errors in a computer system, the computer system having a prefetch mechanism, an instruction pipeline, and a branch prediction mechanism, the method comprising:

providing a set of program instructions comprising an error managing instruction set and a set of post branch instructions, wherein said error managing instruction set includes a conditional branch instruction and a system fault-causing instruction, said system fault-causing instruction is executed when the branch is taken, and said set of post branch instructions are listed for execution whether or not the branch is taken; and prefetching into the instruction pipeline at least said conditional branch instruction and said set of post branch instructions, wherein said set of post branch instructions are prefetched whether the branch prediction mechanism predicts that the branch will be taken or not and potential consequences of a wrong branch prediction are thereby at least reduced.

9. The media of claim 8, wherein said system fault-causing instruction in said method immediately follows said conditional branch instruction.

10. The media of claim 8, wherein said system fault-causing instruction in said method is not contiguous in instruction memory with said conditional branch instruction.

11. The media of claim 8, wherein said system fault-causing instruction in said method immediately follows said conditional branch instruction and said conditional branch instruction is configured to cause program flow to bypass said system fault-causing instruction when the branch is not taken.

12. The media of claim 8, wherein said method further comprises:

executing said conditional branch instruction.

13. The media of claim 12, wherein said method further comprises:

executing said system fault-causing instruction.

14. The media of claim 13, wherein said method further comprises:

executing a system-level trap management program upon execution of said system fault-causing instruction.

* * * * *